United States Patent
Anand et al.

(10) Patent No.: US 12,309,205 B1
(45) Date of Patent: May 20, 2025

(54) SYSTEMS AND METHODS CONFIGURED FOR AUTOMATICALLY PREDICTING DEVICE TYPES FOR SCANNED DEVICES ON A NETWORK

(71) Applicant: Virtualitics, Inc., Pasadena, CA (US)

(72) Inventors: Vaibhav Anand, Chicago, IL (US); Charles Joseph Bonfield, Raleigh, NC (US); Jae Gook Ro, Chantilly, VA (US); Brandon Lee Knight, South Lake Tahoe, CA (US); Sarthak Sahu, Pasadena, CA (US); Ciro Donalek, Pasadena, CA (US); Michael Amori, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 18/818,320

(22) Filed: Aug. 28, 2024

Related U.S. Application Data

(60) Provisional application No. 63/649,193, filed on May 17, 2024.

(51) Int. Cl.
| | |
|---|---|
| *G06F 21/56* | (2013.01) |
| *G06F 21/57* | (2013.01) |
| *H04L 9/40* | (2022.01) |
| *H04L 41/12* | (2022.01) |
| H04L 29/06 | (2006.01) |

(52) U.S. Cl.
CPC .............. *H04L 63/20* (2013.01); *H04L 41/12* (2013.01)

(58) Field of Classification Search
CPC ................................. H04L 63/20; H04L 41/12
See application file for complete search history.

(56) References Cited

U.S. PATENT DOCUMENTS

| | | | |
|---|---|---|---|
| 8,332,947 B1 | 12/2012 | Bregman et al. | |
| 8,555,388 B1 | 10/2013 | Wang et al. | |
| (Continued) | | | |

FOREIGN PATENT DOCUMENTS

| | | |
|---|---|---|
| CN | 106790190 A | 5/2017 |
| CN | 107347074 A | 11/2017 |
| (Continued) | | |

OTHER PUBLICATIONS

Liang Chen, Jie Li, Bo Zhang; "Intelligent Penetration Technology of Power Web System Vulnerability Based on Deep Learning"; 2021 International Conference on Computer, Blockchain and Financial Development (CBFD); Year: Aug. 2021; Conference Paper; Publisher: IEEE; pp. 209-213 (Year: 2021).*

*Primary Examiner* — Shewaye Gelagay
*Assistant Examiner* — Courtney D Fields
(74) *Attorney, Agent, or Firm* — Greenberg Traurig, LLP

(57) ABSTRACT

In some embodiments, the present disclosure provides an exemplary method that may include steps of obtaining data associated with a device within a network; determining a software being performed via type information of the device based on a scan of the network and data associated with the device; generating a type label for the device based on the software being performed; and generating, by the processor, a network security map that represents a topology of the network, wherein the network security map maps the device within the topology according to the type label so as to facilitate causing at least one security action with respect to the device within the network.

27 Claims, 9 Drawing Sheets

(56) References Cited

U.S. PATENT DOCUMENTS

| | | |
|---|---|---|
| 9,747,570 B1 | 8/2017 | Vescio |
| 11,418,543 B2 * | 8/2022 | Xuan ................... H04L 63/1433 |
| 11,528,189 B1 | 12/2022 | Egri et al. |
| 2006/0272011 A1 | 11/2006 | Ide et al. |
| 2016/0352569 A1 | 12/2016 | Galliher, III et al. |
| 2017/0374094 A1 | 12/2017 | Agarmore et al. |
| 2018/0124091 A1 | 5/2018 | Sweeney et al. |
| 2018/0324219 A1 | 11/2018 | Xie et al. |
| 2018/0336353 A1 | 11/2018 | Manadhata et al. |
| 2018/0351987 A1 | 12/2018 | Patel et al. |
| 2019/0289029 A1 | 9/2019 | Chawla et al. |
| 2019/0296979 A1 | 9/2019 | Gupta et al. |
| 2020/0167705 A1 | 5/2020 | Risoldi et al. |
| 2020/0311298 A1 | 10/2020 | Dunjic et al. |
| 2020/0412757 A1 | 12/2020 | Siddiq |
| 2021/0099475 A1 | 4/2021 | Eshghi et al. |
| 2021/0211450 A1 | 7/2021 | Aleidan |
| 2021/0211452 A1 | 7/2021 | Patel et al. |
| 2021/0218765 A1 | 7/2021 | Rodriguez Bravo et al. |
| 2021/0266340 A1 | 8/2021 | Grounds et al. |
| 2021/0344713 A1 | 11/2021 | Kras et al. |
| 2022/0046045 A1 | 2/2022 | Rao et al. |
| 2022/0046048 A1 | 2/2022 | Koo et al. |
| 2022/0060509 A1 | 2/2022 | Crabtree et al. |
| 2022/0191230 A1 | 6/2022 | Morgan |
| 2022/0263855 A1 | 8/2022 | Engelberg et al. |
| 2022/0303290 A1 * | 9/2022 | Baidya ................ H04L 63/1441 |
| 2022/0353169 A1 | 11/2022 | Balinzo et al. |
| 2023/0004655 A1 | 1/2023 | Poulin et al. |
| 2023/0047450 A1 | 2/2023 | Koo et al. |
| 2023/0208870 A1 * | 6/2023 | Yellapragada .......... G06F 21/53 726/22 |
| 2023/0208871 A1 | 6/2023 | Yellapragada et al. |
| 2023/0262093 A1 * | 8/2023 | Gupta ................. H04L 63/1425 726/1 |
| 2023/0300161 A1 | 9/2023 | Jenks et al. |
| 2023/0334361 A1 | 10/2023 | Yamanaka |
| 2023/0336579 A1 | 10/2023 | Ellsworth |
| 2023/0336581 A1 | 10/2023 | Dunn et al. |
| 2024/0007350 A1 | 1/2024 | Gupta et al. |
| 2024/0095150 A1 | 3/2024 | Sahu et al. |
| 2024/0187439 A1 | 6/2024 | Sand et al. |
| 2024/0333683 A1 | 10/2024 | Sestan et al. |
| 2024/0338455 A1 | 10/2024 | Madison, Jr. et al. |
| 2024/0356960 A1 | 10/2024 | Griffin et al. |

FOREIGN PATENT DOCUMENTS

| | | | |
|---|---|---|---|
| CN | 112291232 A | 1/2021 | |
| CN | 116800548 A | 9/2023 | |
| EP | 3220595 A1 | 9/2017 | |
| EP | 3428828 A1 * | 1/2019 | ........... G06F 21/577 |
| WO | 2022125957 A2 | 6/2022 | |
| WO | 2023021499 A1 | 2/2023 | |
| WO | 2023064007 A1 | 4/2023 | |

* cited by examiner

SYSTEMS AND METHODS CONFIGURED FOR AUTOMATICALLY PREDICTING DEVICE TYPES FOR SCANNED DEVICES ON A NETWORK

FIELD OF TECHNOLOGY

The present disclosure generally relates to automatically predicting device types for scanned devices on a network and methods of use thereof.

BACKGROUND OF TECHNOLOGY

Typically, network mapping is the study of the physical connectivity of networks, such as the internet. Network mapping discovers the devices on the network and their connectivity. Network mapping retrieves information about which devices and servers are connected to a specific network and the operating systems that they run. Network enumeration is the discovery of hosts or device on a network and can scan various ports on remote hosts to identify well known services in an attempt to further identify the function of a remote host.

SUMMARY OF DESCRIBED SUBJECT MATTER

In some embodiments, the present disclosure provides an exemplary technically improved computer-based method that includes at least the following steps: obtaining, by one or more processors, usage data associated with a user over a predetermined period of time; utilizing, by one or more processors, a trained machine learning module to determine a correlation between a particular data point within the usage data and an established usage baseline associated with the user; dynamically generating, by one or more processors, a recommendation for the user based on the correlation between the particular data point and the established usage baseline; and automatically applying, by one or more processors, the generated recommendation to an account of the user.

In some embodiments, the present disclosure provides a technically-improved computer-based system that includes a processor capable of instructing at least the following steps: obtain usage data associated with a user over a predetermined period of time; utilize a trained machine learning module to determine a correlation between a particular data point within the usage data and an established usage baseline associated with the user; dynamically generate a recommendation for the user based on the correlation between the particular data point and the established usage baseline; and automatically apply the recommendation to an account of the user.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
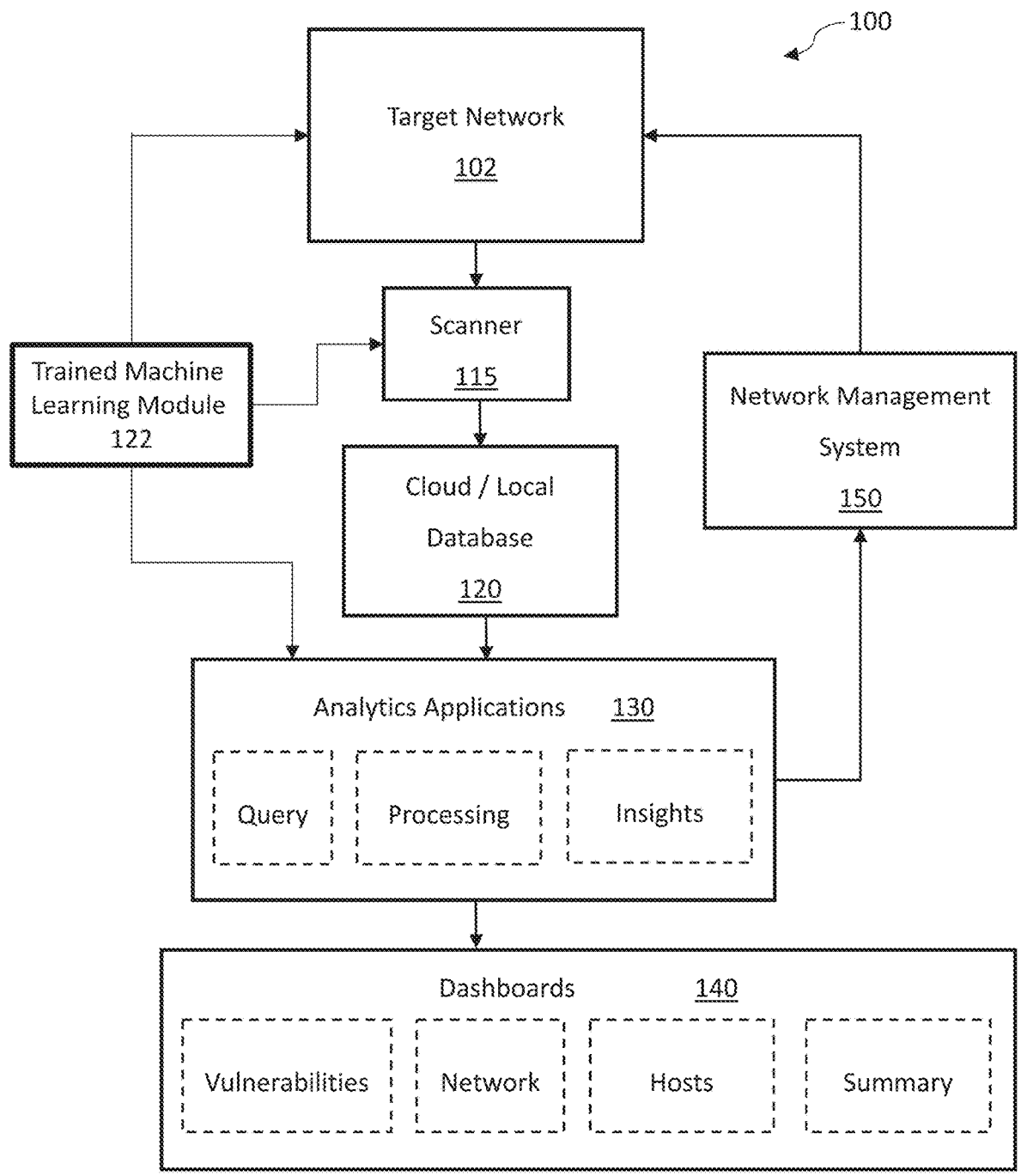
FIG. 1 depicts a block diagram of an exemplary computer-based system and platform for assigning type labels to a plurality of devices within a network to optimize securing a computer network, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Each and every principle, methodology and/or system arrangement detailed herein may be utilized with one or more principles, methodology(ies) and/or system arrangement(s) detailed in one or more of: U.S. Pat. Nos. 10,454,597; 11,734,157; U.S. Patent Publication 2022/0342873; U.S. Patent Publication 2023/0004557; U.S. Patent Publication 2023/0077998; U.S. Patent Publication 2023/0013873; U.S. Patent Publication 2023/0306044, and Appendix A materials.

The present disclosure describes, in detail, systems and methods of utilizing a trained encoder to determine type data associated with each device within a plurality of devices within a network and automatically map a terrain of devices within the network based on each the type data of the plurality of devices. The following embodiments provide technical solutions and technical improvements over technical problems, drawbacks and/or deficiencies in the technical fields involving network security, digital fingerprinting, type labeling of devices, and network mapping. Specifically, a technological problem exists in merely determining a type for a host in a particular network at a particular time. Typically, a single configuration scan may provide information at the particular time of the scan, when, in actuality, the information may vary over time, especially when devices change physical and/or virtual location.

As explained in more detail below, technical solutions and technical improvements herein include aspects of improved technologies for utilizing a trained machine learning module to dynamically assign one or more unique identification codes to one or more devices within a network; calculating a confidence score for the codes assigned to one or more devices within the network; determining type information for the one or more devices based on the confidence score; and performing a security operation based on the type information. The trained machine learning module may be capable of making comparisons across a plurality of fields (e.g., operating systems) that identify devices and implicitly determine type information associated with each device. In certain embodiments, the trained machine learning module may refer to a plurality of logic trees capable of comparing unique identification codes and a plurality of features associated with each unique identification code for a plurality of devices to assign one or more type labels to each device. For example, these type labels associated with the type information (e.g., metadata) for each device may include workstation, server, router and/or switch (e.g., networking devices), printer and embedded system. In some embodiments, the unique identification code may refer to a digital fingerprint associated with each device. In some embodiments, each device may refer to a host computing device capable of performing operations within the network. The trained encoder may also generate one or more vectors associated with each unique identification code for a particular device. Each particular device may refer to a particular host device, such as a computing device, a server computing device, a workstation, a laptop, and/or a smartphone. In some embodiments, the trained machine learning module may utilize a semi-supervised model framework to predict type information for each device of the plurality of devices and may store the unique identification codes in an identification code database. In certain embodiments, the identification code database may refer to a data repository. The trained machine learning module may scan the plurality of devices to obtain type information data related to a particular unique identification code associated with each device and the plurality of features associated with the particular unique identification code. In certain embodiments, the output of the scan may result in labeled data and unlabeled data, where the labeled data may refer to a predicted and/or implicit type information. The unlabeled data may result in a lower confidence score of a plurality of host type predictions and may result in a second scan of the plurality of devices within the network. In certain embodiments, the trained machine learning module may require additional type information for implicit assignment of type labels to each device of the plurality of devices for subsequent scans of the plurality of devices within the network. In some embodiments, the trained machine learning module may augment scan data before assigning a digital fingerprint for each device of the plurality of devices. In conjunction with assigning the digital fingerprint to each device, the trained machine learning module may determine the type information of each device and assign a type label to each device based on the digital fingerprint. In certain embodiments, the output from the trained machine learning module may be sent to a user interface to display the determined type information for each device of the plurality of devices within the network. In some embodiments, the trained machine learning module may refer to a host type labeling model. In certain embodiments, the trained machine learning modules may be any supervised machine learning module used for multi-class classification. For example, the trained machine learning module may refer to a logistic regression model, a random forest model, and/or gradient boosting machines model. The calculation of a confidence score may predict an optimal vector value for a particular device by leveraging a weighting scheme to reduce a likelihood of significant misclassifications, where the confidence score associated with the particular device quantifies the likelihood that the prediction is a match to the predicted vector value (in this case, host type). In some embodiments, the trained machine learning module may communicate with a trained encoder to assign a digital fingerprint for each device, a prediction for type information for each device, and generate a type label for each device of the plurality of devices using both the digital fingerprints and plurality of type predictions. In some embodiments, a confidence score for a particular device may refer to a calculated cosine similarity between the predicted type information and the type information for a set of exemplar devices. In some embodiments, the trained machine learning module may store the plurality of type labels for each device of the plurality of devices associated with the confidence score exceeding a predetermined threshold of similarity. In certain embodiments, the predetermined threshold of similarity may refer to a value set for similarity scores to determine matches between at least two devices of the plurality of devices. In certain embodiments, the predetermined threshold of similarity may refer to a quantification of a degree of agreement between a host of a given type and a highest-ranked representative set of features for that given type.

In some embodiments, the present disclosure may optimize the comparison of the predicted type information and the determined type information based on an augmented scan of the plurality of devices. In certain embodiments, the data repository may contain a plurality of pre-generated type labels associated with the type information for each device. In some embodiments, a plurality of features within each digital fingerprint may be assigned a particular weight based on historical data and/or user input, where a weighted feature may modify the confidence score calculation. In certain embodiments, the plurality of features may refer to a host risk score, a number of detected vulnerabilities, a remediation rate, and a host type. In some embodiments, one or more processors of a computing device may perform similar functions of a trained machine learning module. In some embodiments, the machine learning module may be trained using historical digital fingerprints for the plurality of devices and historical type information associated with the historical digital fingerprints. In certain embodiments, the trained machine learning module may filter one or more type labels associated with a large collection of devices within a given network. The pre-generated type labels may refer to a collection of type labels associated with the plurality of devices, where each type label may refer to a particular function for a particular device. In some embodiments, the trained machine learning module may identify the plurality of features associated with the digital fingerprint associated with each device of the plurality of devices, predict the type information for each device, determine the type information associated with each device based on the digital fingerprint, compute the confidence score between the predicted type information and the determined associated with the particular device and the data embeddings associated with the plurality of devices, compare the calculated similarity score to the predetermined threshold of similarity to assign a type label to each device of the plurality of device in response to a confidence score that exceeds the threshold; and automatically map each device of the plurality of devices within the network. For example, the trained machine learning module may automatically map the plurality of devices within the network at a given time and dynamically track movement by the plurality of devices within the network. In certain embodiments, the trained machine learning module may ingest the results of a performed scan of the network.

In some embodiments, the output of the trained machine learning module may be sent to a device interface that may generate a device summary report, where the device summary report may provide a host risk score, a number of detected vulnerabilities, a remediation rate, and host IP information. In certain embodiments, the trained machine learning module may identify a particular device within the plurality of devices based on the digital fingerprint and dynamically predict the type information of the particular device based on the digital fingerprint. In certain embodiments and in response to an augmented scan of the plurality of devices within the network, the trained machine learning module may assign a type label to each device of the plurality of devices.

FIG. 1 is a block diagram of a network system 100 for assigning type labels to a plurality of devices within a network to optimize securing a computer network in accordance with one or more embodiments of the present disclosure. The network system 100 may include a scanner 115, a cloud and/or local database 120, at least one analytics application(s) 130, at least one dashboard(s) 140 and a network management system 150 for securing a target network 102.

In some embodiments, the scanner 115 may run on the target network 102 from a scanner device to explore and gather information about devices of the target network 102. For example, the scanner 115 can scan the target network 102 and identify media access control (MAC) addresses associated with all the devices connected therein. In some embodiments, the scanner 115 can identify active Internet protocol (IP) addresses within a given range or subnet and determine availability of one or more devices on the target network 102. Scans may include, but are not limited to, device discovery and vulnerability scans. In some embodiments and in response to predicting type information for one or more devices of the plurality of devices, the scanner 115 may perform an augmented scan of the target network 102 to compare predicted type information of the plurality of devices and the determined type information to assign type labels to each device based on the augmented scan.

In some embodiments, the scan results may be pushed to database 120 for retrieval. The database 120 may be cloud-based or local to the scanner 115 or both. In some embodiments, the database 120 may refer to the data repository. By pushing the scan results to the database 120, the network system 100 can predict the type information based on the digital fingerprint associated with each device, determine the type information of each device based on an augmented scan, compare the predicted type information and the determined type information, and calculate a confidence score based on the comparison of the type information to automatically map the target network 102. In certain embodiments, the network system 100 can assess and monitor network vulnerability, maintain an asset inventory, detect changes in the target network 102 and centralize reporting and analysis.

In some embodiments, the scanner 115 may transmit vulnerability assessment scan results to the database 120, where a user can maintain a historical record of security assessments and the historical data that includes historical type labels for the plurality of devices and historical features. In certain embodiments, this historical data may be utilized to train a machine learning module 122. The trained machine learning module 122 may refer to a machine learning model and/or a plurality of logic trees capable of predicting the type information based on the digital fingerprint associated with each device, determining the type information of each device based on an augmented scan, comparing the predicted type information and the determined type information, and calculating a confidence score based on the comparison of the type information to automatically map the target network 102. In some embodiments, the trained machine learning module 122 may track changes over time, compare results, and ensure compliance with security policies.

In some embodiments, the trained machine learning modules 122 may assign a plurality of type labels for the plurality of devices identified by the scanner 115 within the target network 102 based on the confidence score between the predicted type information and the determined type information. In some embodiments, the output of the scanner 115 (e.g., network scans) may reveal type information about the plurality of devices running on the target network 102, where the network scans may provide metadata related to each device and any software being performed by each device. In some embodiments, the network system 100 may generate an inventory of network assets in response to transmitting the output of the scanner 115 to the database 120.

In some embodiments, the network system 100 may perform a plurality of network scans for the plurality of devices to detect changes in the network environment. In some embodiments, the trained machine learning module 122 may dynamically track modifications within the plurality of devices by storing scan results in the database 120. In certain embodiments, the modifications that can be tracked may include new devices added; software installations or updates; and configuration changes. In other embodiments, the new devices may be identified by a digital fingerprint not found within the database 120. In some embodiments, an augmented network scan may assist the trained machine learning module 122 to calculate the confidence score associated with each device by comparing the predicted type information and the determined type information associated with each device.

In some embodiments, the network system 100 may calculate a confidence score for one or more devices within the plurality of devices based on the digital fingerprints, specifically the plurality of features in comparison to a predetermined threshold of similarity. In certain embodiments, the database 120 may provide a centralized repository for scan results to optimize centralized reporting and analysis. In some embodiments, the trained machine learning module 122, in communication with the database 120, may generate reports, visualize trends, and analyze patterns within the target network 102. In certain embodiments, the analytics application(s) 130 may generate reports, visualize trends, and analyze patterns within the target network 102. For example, the trained machine learning module 122 may generate a plurality of notifications that can be displayed via a user interface, where the plurality of notifications may facilitate decision-making, risk assessment, and resource allocation for the plurality of devices within the target network 102.

In some embodiments, the at least one analytics application(s) 130 may query the database 120 to retrieve scan results, analyze scan results, and assign the plurality of type labels to each device of the plurality of devices based on the digital fingerprints to one or more devices within the plurality of devices and displayed via a user interface to end users. In some embodiments, the at least one analytics application(s) 130 may involve the process of collecting and analyzing network data to improve various aspects of the target network 102. The present disclosure describes a system and method to automate assigning digital fingerprints to each device within the plurality of devices.

In some embodiments, the at least one analytics application(s) 130 may extract data collected from the plurality of devices, where the plurality of devices may include: network devices (such as switches, routers, and wireless access points), servers (including syslog, DHCP, AAA, and configuration databases), and traffic-flow details (such as wireless congestion, data speeds, and latency). In certain embodiments, the at least one analytics application(s) 130 may provide insights of the target network 102 to identify host risk scores, any vulnerabilities of each device, a remediation rate and device IP information for each device of the plurality of devices. In certain embodiments, the at least one analytics application(s) 130 may provide insights of the target network 102 to identify a network risk score, a number of at-risk devices within the plurality of devices, a remediation rate, and the number of devices within the plurality of devices. In certain embodiments, the at least one analytics application(s) 130 may evaluate the health of network devices, recommend adjustments to enhance performance, analyze traffic to and from endpoints to build profiles, and detect anomalies that may indicate compromised endpoints.

As shown in FIG. 1, the insights generated by the at least one analytics application(s) 130 may be provided to both the at least one dashboard(s) 140 and the network management system. 150. In some embodiments, the at least one dashboard(s) 140 may display vulnerabilities of the target network 102, network data, particular device data, a device summary and a network summary.

In some embodiments, the network management system 150 may be an application or set of applications that enables network administrators to manage various components within the target network. It provides a unified platform for configuring, monitoring and optimizing network performance. In an embodiment, the network management system 150 allows administrators to set up and adjust network devices type labels (such as a switch label, a router label, and an access point label) according to specific requirements. It collects real-time data from network elements and endpoint devices (e.g., mobile phones, laptops). This data helps proactively identify performance issues, monitor security, and segment the network automatically map the target network 102. The network management system 150 may accelerate problem resolution by providing insights into network health and performance. The network management system 150 assists in monitoring security events, detecting anomalies, and ensuring compliance with security policies.

Figure 2:
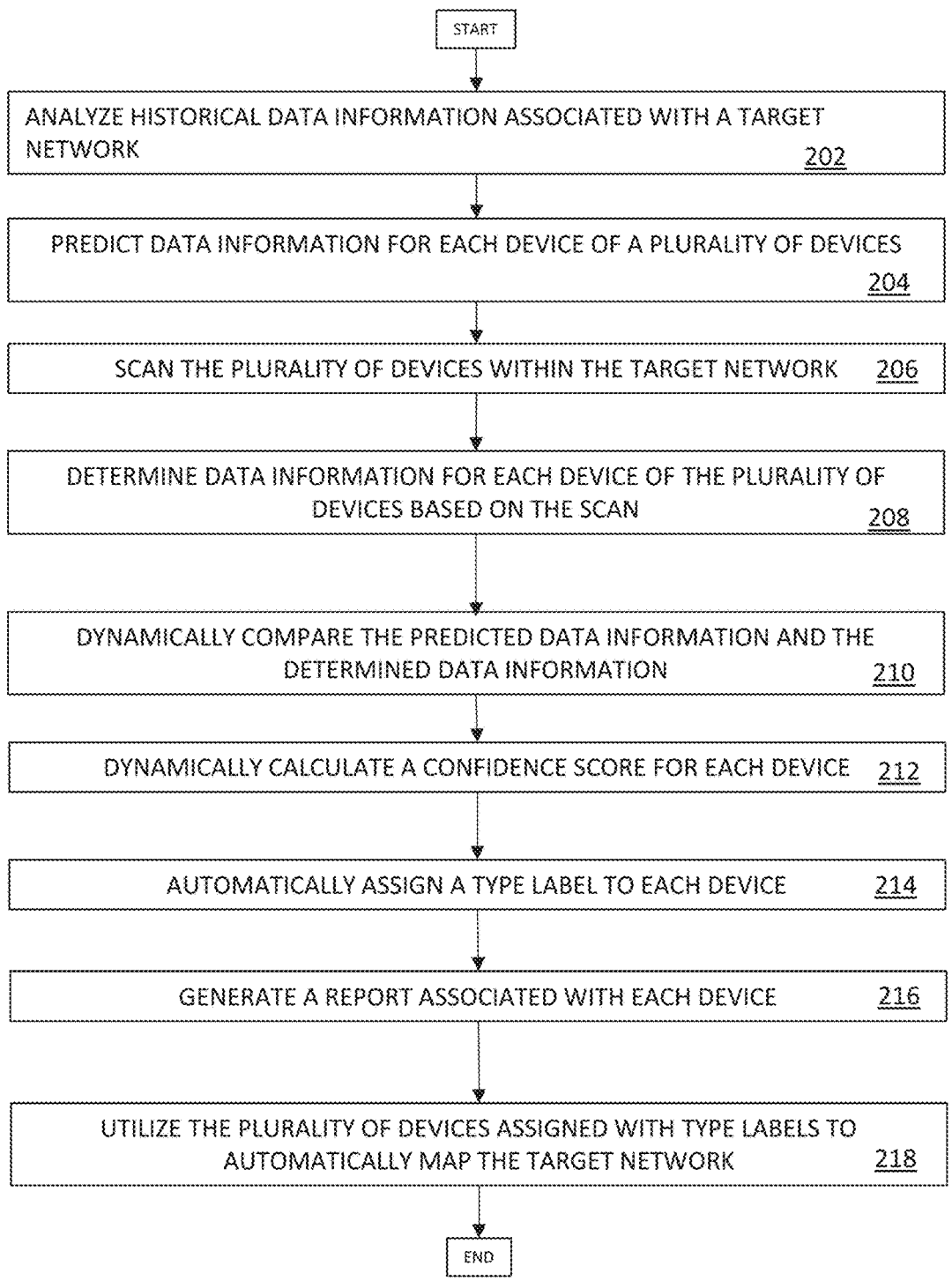
FIG. 2 is a flowchart illustrating operational steps for assigning a type label to one or more devices of the plurality of devices based on a calculated confidence score between the predicted type information and the determined type information, in accordance with one or more embodiments of the present disclosure.

FIG. 2 is a flowchart 200 depicting operational steps for assigning a type label to one or more devices of the plurality of devices based on a calculated confidence score between the predicted type information and the determined type information. In some embodiments, at least one processor of a computing device may perform the following steps, where the steps respectively correlate with 202-220 of FIG. 2. In step 202, the at least one processor may analyze historical data information associated with the target network. In step 204, the at least one processor may train a machine learning module based on the historical data information associated with the target network. In step 206, the at least one processor may predict data information for each device of a plurality of devices within the target network. In step 208, the at least one processor may scan the plurality of devices within the network to obtain metadata for each device. In step 210, the at least one processor may determine data information for each device of the plurality of devices based on the scan. In step 212, the at least one processor may dynamically compare the predicted data information and the determined data information for each device of the plurality of devices. In step 214, the at least one processor may dynamically calculate a confidence score for each device based on a comparison of the predicted data information and the determined data information. In step 216, the at least one processor may automatically assign a type label to each device in response to the confidence score for a particular device exceeding a predetermined threshold of similarity, where the type label provides a description of the metadata associated with the particular device. In step 218, the at least one processor may generate a report associated with each device of the plurality of devices assigned a type label for subsequent scans of the target network. In step 220, the at least one processor may utilize the plurality of devices assigned with type labels to automatically map the target network 102.

In some embodiments, the historical data information may refer to a digital fingerprint and/or any software functions being performed by the device to efficiently identify each device of the plurality of devices within the target network 102. In some embodiments, the metadata for each device may include the device IP address, a host name, one or more MAC address(es), a detected operating system, and one or more detected service(s). In some embodiments, the calculated confidence score may aggregate a value of an existing type information and a value associated with a non-existing type information and aggregate the two values. In certain embodiments, the aggregate of the two values may refer to a value associated with a max confidence value associated with the type information. The predicted type information may refer to a determination based on the digital fingerprint of the device and the metadata associated with that particular digital fingerprint. In certain embodiments, the determination of the type information in response to the scan may refer to a verification of the predicted type information to optimize the training of the machine learning module. In some embodiments, the trained machine learning module 122 may perform the steps 202-220 of FIG. 2.

Figure 3:
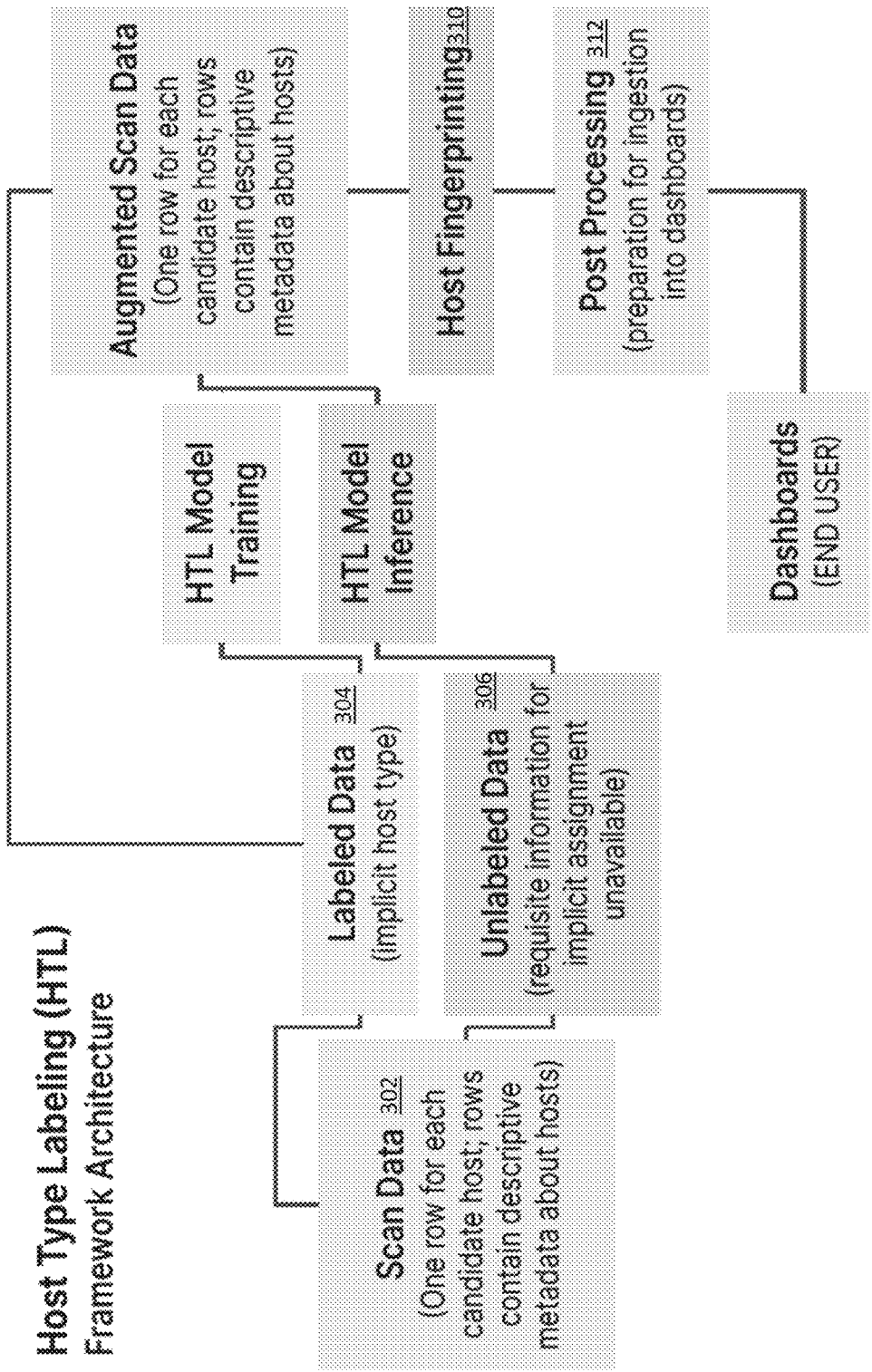
FIG. 3 depicts a block diagram of the trained machine learning module, in accordance with one or more embodiments of the present disclosure.

FIG. 3 depicts a block diagram 300 of the trained machine learning module 122, in accordance with one or more embodiments of the present disclosure. In FIG. 3, the trained machine learning module 122 may identify scan data 302 associated with the plurality of devices within the target network 102. In some embodiments, the trained machine learning module 122 may sort the scan data 302 into a labeled data database 304 and an unlabeled data database 306, where the labeled data database 304 stores predicted data types for the plurality of devices and the unlabeled data database 306 stores data information for the plurality of devices that fails to meet the predetermined threshold of similarity and remains unlabeled. In certain embodiments, the unlabeled data may require an augmented scan. In some embodiments, the trained machine learning module 122 may utilize the labeled data as input data for training. In some embodiments, the trained machine learning module 122 may utilize the unlabeled data as input data for an augmented scan of the plurality of devices. In some embodiments, the trained machine learning module 122 may generate predictions for the unlabeled data without additional input(s). In some embodiments, the output of the augmented scan of the plurality of devices may refer to augmented scan data 308. In some embodiments, the trained machine learning module 122 may utilize a trained encoder to assign digital fingerprints 310 to each device based on the augmented scan data 308. In some embodiments, the trained machine learning module 122 may assign one or more type labels 312 as a process in response to the assignment of digital fingerprints 310 to each device. In some embodiments, the trained machine learning module 122 may display the assigned one or more type labels 312 via a user interface to automatically map the target network 102.

Figure 4:
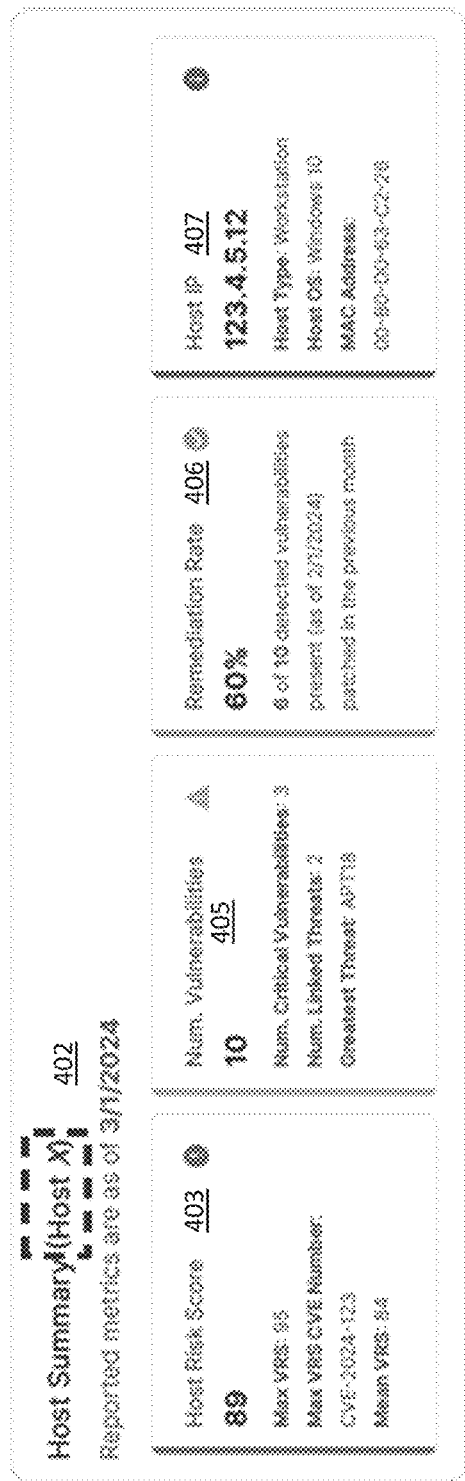
FIG. 4 depicts an example output of the trained machine learning module based on the scans of the plurality of devices within the target network, in accordance with one or more embodiments of the present disclosure.

FIG. 4 depicts an example output 400 of the trained machine learning module 122 based on the scans of the plurality of devices within the target network 102, specifically the comparison of the predicted type information and the determined type information. The output of the trained machine learning module 122 may display, via a user interface, a device summary report 402. In the device summary report 402, a host risk score 403, a number of detected vulnerabilities 405, a remediation rate 406, and a device IP information 407 may be displayed via the user interface.

Figure 5:
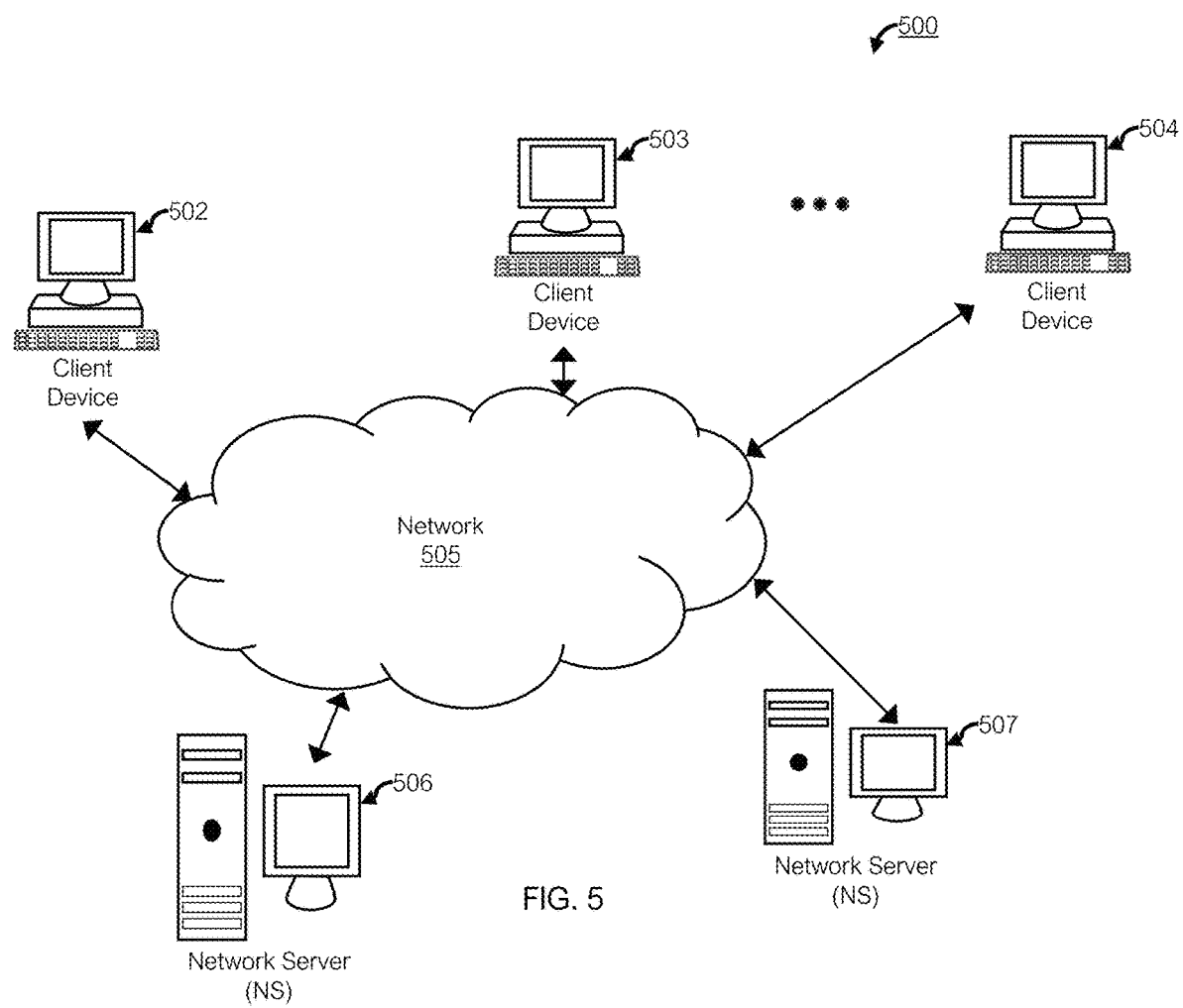
FIG. 5 depicts a block diagram of an exemplary computer-based system/platform in accordance with one or more embodiments of the present disclosure.

FIG. 5 depicts a block diagram of an exemplary computer-based system and platform 500 for the data optimization module in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to generate a plurality of unique identification codes for the plurality of devices, compare the plurality of unique identification codes, and calculate a similarity score based on the comparison of the plurality of unique identification codes, as detailed herein. In some embodiments, the exemplary computer-based system and platform 500 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 5, client device 502, client device 503 through client device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the client devices 502 through 504 may be personal computers, multiprocessor systems, microprocessor-based or programmable consumer electronics, network PCs, and the like. In some embodiments, one or more client devices within client devices 502 through 504 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 502 through 504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 502 through 504 may run one or more applications, such as Internet browsers, mobile applications, voice calls, video games, videoconferencing, and email, among others. In some embodiments, one or more client devices within client devices 502 through 504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 502 through 504 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advanced user, standard user. In some embodiments, one or more client devices within client devices 502 through 504 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 501 through 504.

In some embodiments and, optionally, in combination of any embodiment described above or below, for example, one or more exemplary computing client devices 502 through 504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
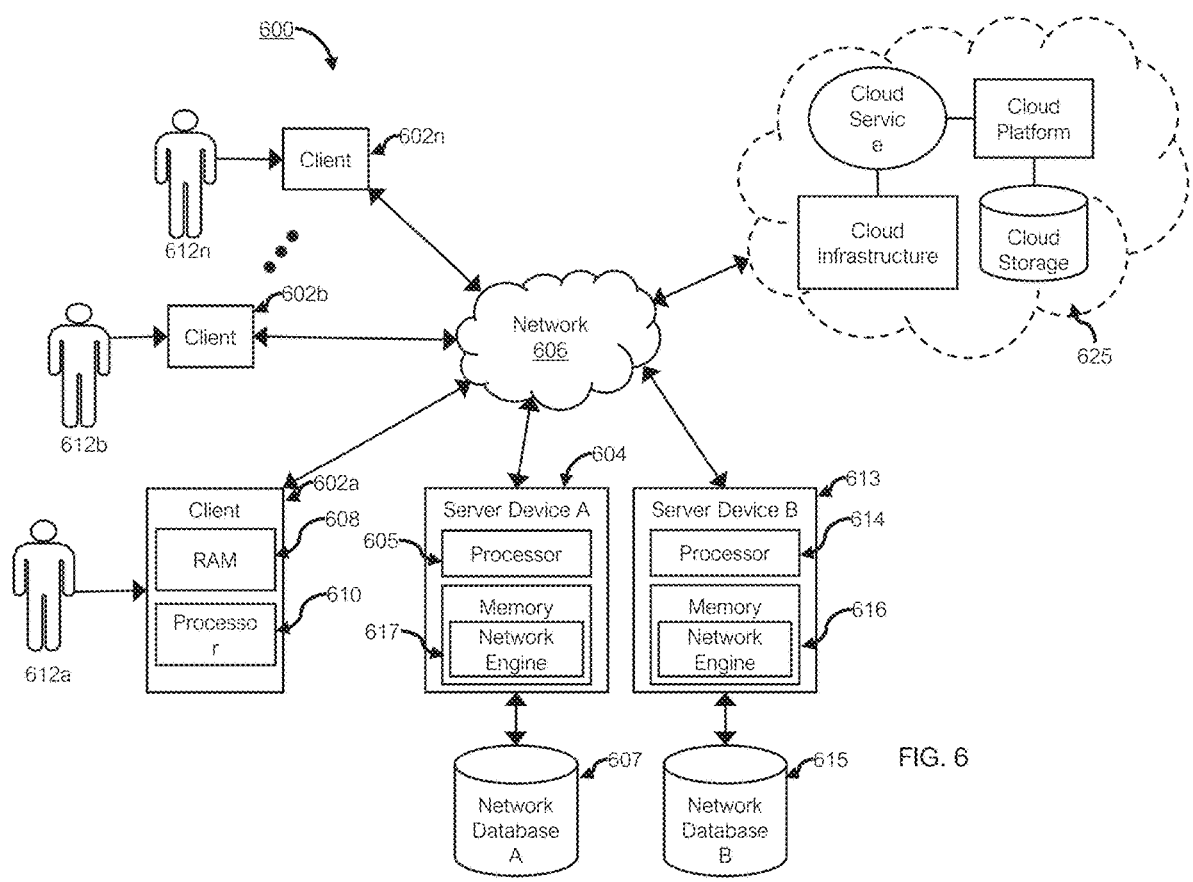
FIG. 6 depicts a block diagram of another exemplary computer-based system/platform in accordance with one or more embodiments of the present disclosure.

FIG. 6 depicts a block diagram of another exemplary computer-based system and platform 600 for the trained machine learning module 122 in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the client device 602a, client device 602b through client device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client device 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 602a through 602n may also comprise a number of external or internal devices such as a mouse, a CD-ROM, DVD, a physical or virtual keyboard, a display, or other input or output devices. In some embodiments, examples of client devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, client devices 602a through 602n may be specifically programmed with one or more application programs in accordance with one or more principles/methodologies detailed herein. In some embodiments, client devices 602a through 602n may operate on any operating system capable of supporting a browser or browser-enabled application, such as Microsoft™, Windows™, and/or Linux. In some embodiments, client devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more client devices 602a through 602n may be mobile clients.

In some embodiments, at least one database of exemplary databases 607 and 615 may be any type of database, including a database managed by a database management system (DBMS). In some embodiments, an exemplary trained machine learning module 122 may be specifically programmed as an engine that controls organization, storage, management, and/or retrieval of data in the respective database. In some embodiments, the exemplary trained machine learning module 122 may be specifically programmed to provide the ability to generate a plurality of unique identification codes for the plurality of devices, compare the plurality of unique identification codes, and calculate a similarity score based on the comparison of the plurality of unique identification codes. In some embodiments, the exemplary trained machine learning module 122 may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
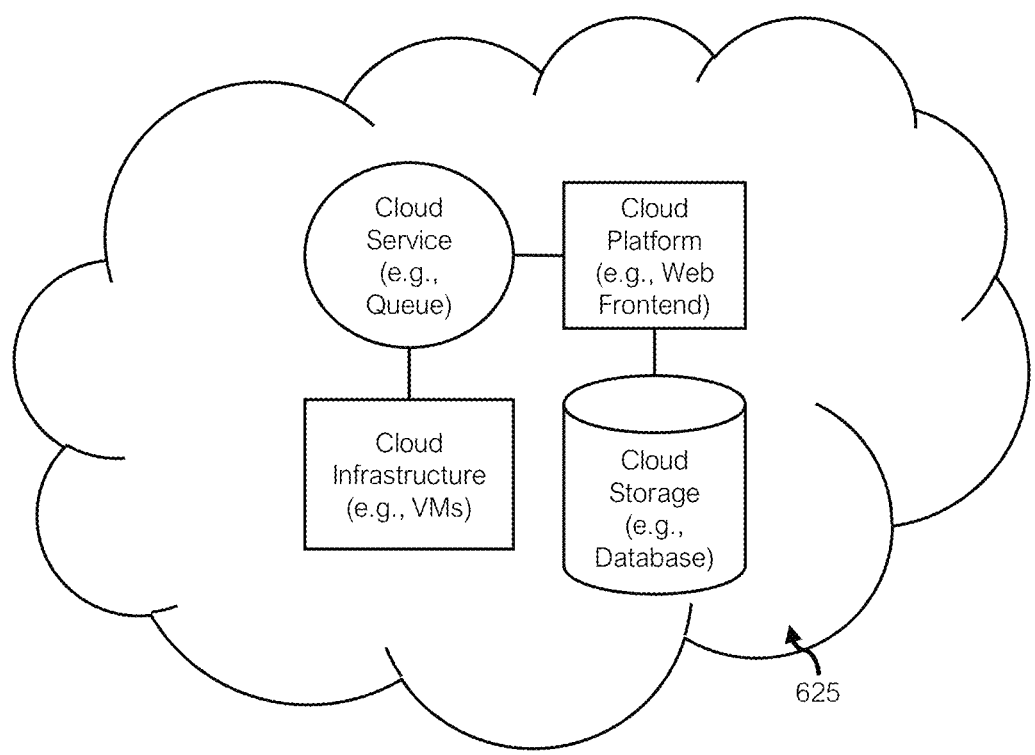
FIGS. 7 and 8 are diagrams illustrating implementations of cloud computing architecture/aspects with respect to which the disclosed technology may be specifically configured to operate, in accordance with one or more embodiments of the present disclosure.
Figure 8:
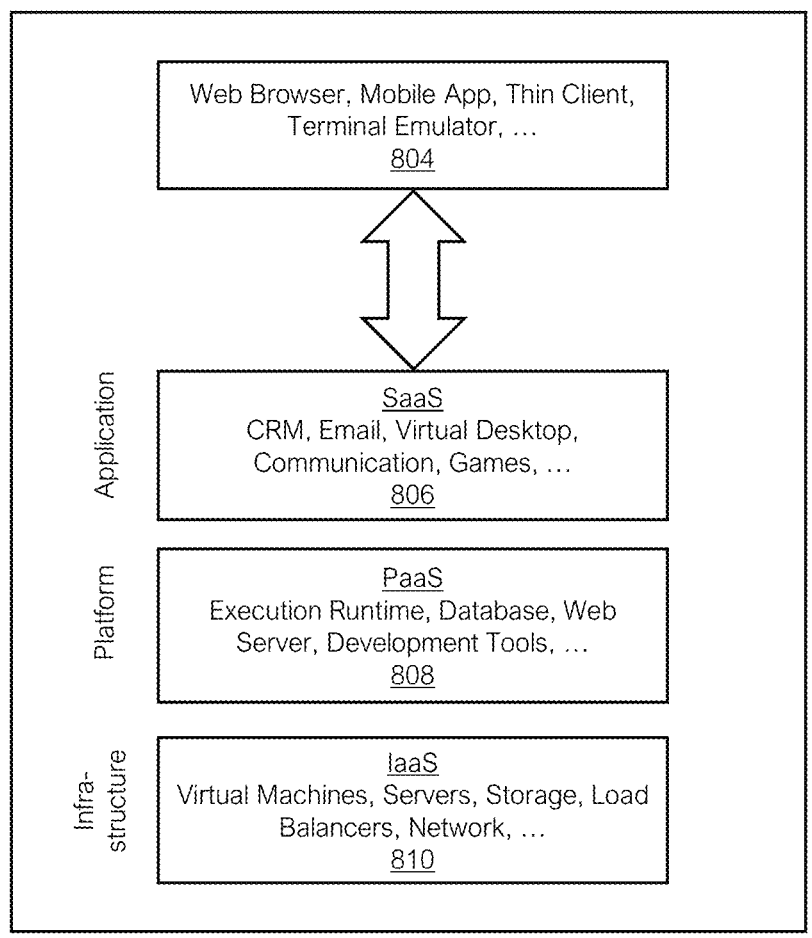

In some embodiments, the exemplary trained machine learning module 122 of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator, or other endpoint 804. FIGS. 7 and 8 illustrate schematics of exemplary implementations of the cloud computing/architecture(s) in which the trained machine learning module 122 of the present disclosure may be specifically configured to operate.

Figure 9:
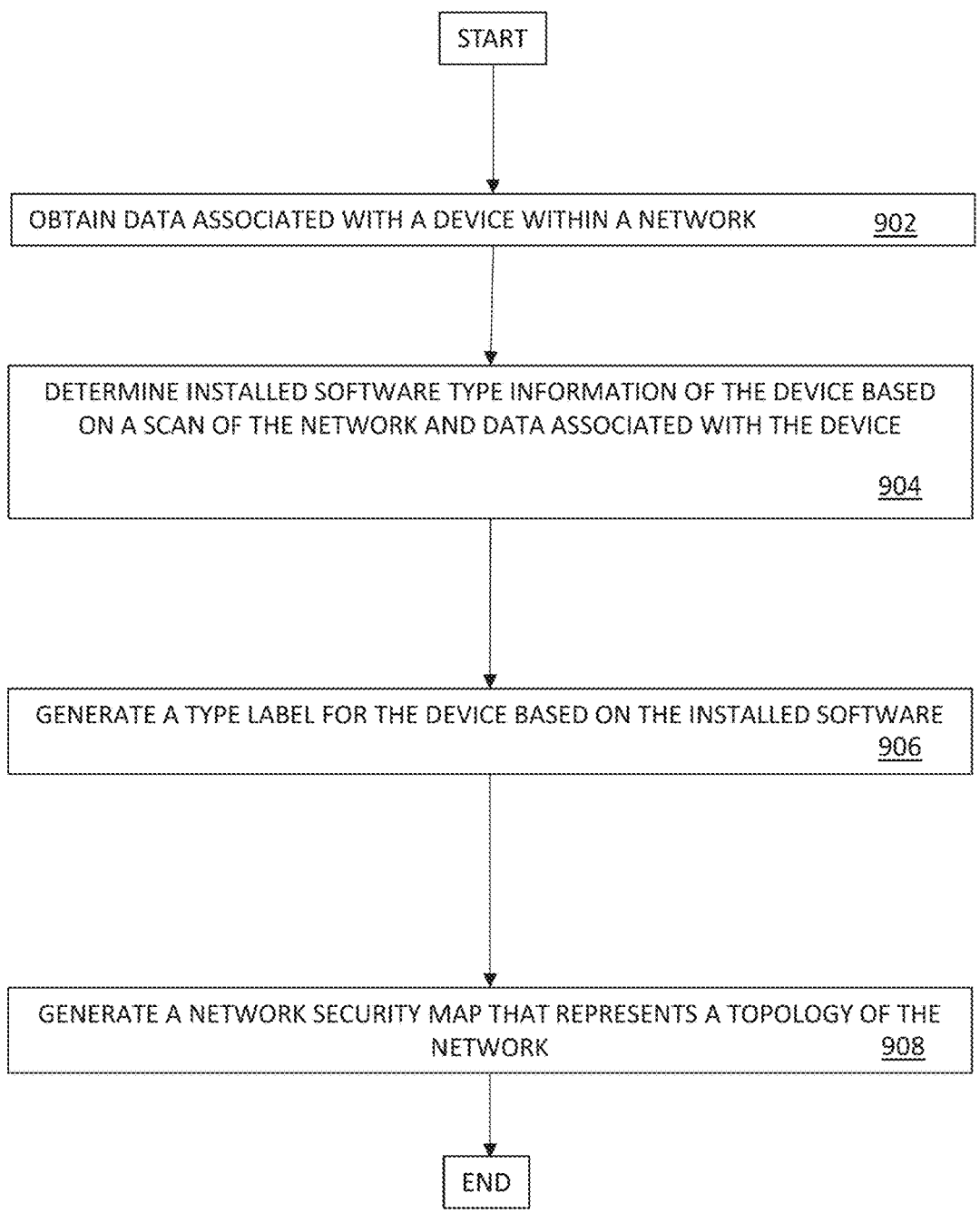
FIG. 9 is a flowchart depicting operational steps for generating a network security map that represents a topology of the network, in accordance with one or more embodiments of the present disclosure.

FIG. 9 is a flowchart 900 depicting operational steps for generating a network security map that represents a topology of the network, in accordance with one or more embodiments of the present disclosure. In some embodiments, at least one processor of a computing device may perform the following steps, where the steps respectively correlate with 902-908 of FIG. 9. In step 902, the at least one processor may obtain data associated with a device within a network. In step 904, the at least one processor may determine installed software via type information on the device based on a scan of the network and the data associated with the device. In step 906, the at least one processor may generate a type label for the device based on the detected software by comparing the type information of the device to a plurality of devices within the network to generate a confidence score for the device; grouping the type information of the device based on the confidence score meeting and/or exceeding a predetermined threshold; and determining the type label for the device based on the grouping of the type information. In step 908, the at least one processor may generate a network security map that represents the topology of the network, where the network security map maps the device within the topology according to the type label so as to facilitate causing at least one security action with respect to the device within the network.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

Clause 1. A computer-implemented method may include: obtaining, by a processor, data associated with a device within a network; determining, by the processor, a software being performed via type information of the device based on a scan of the network and data associated with the device; generating, by the processor, a type label for the device based on the software being performed by: comparing the type information of the device to a plurality of devices within the network to generate a confidence score for the device; grouping the type information of the device based on the confidence score meeting a predetermined threshold; and determining the type label for the device based on of the grouping of the type information; and generating, by the processor, a network security map that represents a topology of the network, wherein the network security map maps the device within the topology according to the type label so as to facilitate causing at least one security action with respect to the device within the network.

Clause 2. The method according to clause 1, where the data includes an active internet protocol address within a range associated with the device.

Clause 3. The method according to clause 1 or 2, where the network includes a target network within a plurality of networks.

Clause 4. The method according to clause 1, 2 or 3, where the scan of the network includes a vulnerability analysis of the device and the plurality of devices within the network.

Clause 5. The method according to clause 1, 2, 3 or 4, where the scan of the network includes an availability analysis of the device and the plurality of devices within the network.

Clause 6. The method according to clause 1, 2, 3, 4 or 5, where the type information of the device includes metadata related to each device and software being performed by the device.

Clause 7. The method according to clause 1, 2, 3, 4, 5 or 6, where the confidence score includes calculating a confidence score for the device based on an output of the scan of the device, wherein the output of the scan comprises a value assigned to a plurality of features associated with the type information of the device.

Clause 8. The method according to clause 1, 2, 3, 4, 5, 6 or 7, further including predicting type information for the device by utilizing a trained machine learning module to analyze historical data within the network and the data associated with the device.

Clause 9. The method according to clause 1, 2, 3, 4, 5, 6, 7, or 8, where the trained machine learning module comprises a trained encoder capable of dynamically tracking modifications to the data associated with the device.

Clause 10. The method according to clause 1, 2, 3, 4, 5, 6, 7, 8 or 9, further including calculating a criticality score of the device based on the type information within the network.

Clause 11. The method according to clause 1, 2, 3, 4, 5, 6, 7, 8, 9 or 10, where the criticality score of the device is representative of a degree of importance to security of the network.

Clause 12. The method according to clause 1, 2, 3, 4, 5, 6, 7, 8, 9, 10 or 11, where the type information comprises a device category, wherein the device category is one of workstation, router, server, printer, camera, or a combination thereof.

Clause 13. The method according to clause 1, 2, 3, 4, 5, 6, 7, 8, 9, 10, 11 or 12, further including conducting the scan of the network and generating the confidence score are conducted repeatedly at a predetermined frequency.

Clause 14. The method according to clause 1, 2, 3, 4, 5, 6, 7, 8, 9, 10, 11, 12 or 13, further including calculating a device risk score for the device in the network based on a historical data associated within the network, a number of detected vulnerabilities within the network, and a criticality score of the device.

Clause 15. A computer-implemented method may include: obtaining, by a processor, data associated with a device within a network; predicting, by the processor, type information for the device by utilizing a trained machine learning module to analyze historical data within the network and the data associated with the device; determining, by the processor, type information of the device based on a scan of the network and predicted type information data associated with the device; comparing, by the processor, the type information of the device to a plurality of devices within the network to generate a confidence score for the device; validating, by the processor, the type information of the device based on the confidence score meeting a predetermined threshold; assigning, by the processor, a type label to the device based on the validating of the type information; and generating, by the processor, a network security map that represents a topology of the network, wherein the network security map maps the device within the topology according to type label so as to facilitate causing at least one security action with respect to the device within the network.

Clause 16. The method according to clause 15, where the data includes an active internet protocol address within a range associated with the device.

Clause 17. The method according to clause 15 or 16, where the scan of the network comprises a vulnerability analysis of the device and the plurality of devices within the network.

Clause 18. The method according to clause 15, 16, or 17, where the scan of the network comprises an availability analysis of the device and the plurality of devices within the network.

Clause 19. The method according to clause 15, 16, 17, or 18, where the type information of the device includes metadata related to each device and software being performed by the device.

Clause 20. The method according to clause 15, 16, 17, 18, or 19, where the confidence score includes calculating a confidence score for the device based on an output of the scan of the device, wherein the output of the scan comprises a value assigned to a plurality of features associated with the type information of the device.

Clause 21. The method according to clause 15, 16, 17, 18, 19, or 20, where the trained machine learning module includes a trained encoder capable of dynamically tracking modifications to the data associated with the device.

Clause 22. The method according to clause 15, 16, 17, 18, 19, 20, or 21, further including a criticality score of the device based on the type information within the network Clause 23. The method according to clause 15, 16, 17, 18, 19, 20, 21, or 22, where the criticality score of the device is representative of a degree of importance to security of the network.

Clause 24. The method according to clause 15, 16, 17, 18, 19, 20, 21, 22, or 23, further including conducting the scan of the network and generating the confidence score are conducted repeatedly at a predetermined frequency.

Clause 25. The method according to clause 15, 16, 17, 18, 19, 20, 21, 22, 23, or 24, further including calculating a device risk score for the device in the network based on a historical data associated within the network, a number of detected vulnerabilities within the network, and a criticality score of the device.

Clause 26. A system includes: a non-transient computer memory, storing software instructions; at least one processor of a computing device associated with a user; where, when the processor executes the software instructions, the computing device is programmed to: obtain data associated with a device within a network; predict type information for the device by utilizing a trained machine learning module to analyze historical data within the network and the data associated with the device; determine type information of the device based on a scan of the network and data associated with the device; compare the type information of the device to a plurality of devices within the network to generate a confidence score for the device; validate the type information of the device based on the confidence score meeting a predetermined threshold; assign a type label to the device based on the validating of the type information; and utilize an assigned type label and the historical data to automatically map a terrain of the network.

Clause 27. The system according to clause 26, where the type information of the device comprises metadata related to each device and software being performed by the device.

Clause 28. The system according to clause 26 or 27, where the confidence score includes calculating a confidence score for the device based on an output of the scan of the device, where the output of the scan includes a value assigned to a plurality of features associated with the type information of the device.

Clause 29. The system according to clause 26, 27, or 28, where the trained machine learning module includes a trained encoder capable of dynamically tracking modifications to the data associated with the device.

Clause 30. A system includes: a non-transient computer memory, storing software instructions; at least one processor of a computing device associated with a user; where, when the processor executes the software instructions, the computing device is programmed to: obtain data associated with a device within a network; determine a software being performed via type information of the device based on a scan of the network and data associated with the device; generate a type label for the device based on the software being performed by: compare the type information of the device to a plurality of devices within the network to generate a confidence score for the device, group the type information of the device based on the confidence score meeting a predetermined threshold; and determine the type label for the device based on of the grouping of the type information; and generate a network security map that represents a topology of the network, wherein the network security map maps the device within the topology according to the type label so as to facilitate causing at least one security action with respect to the device within the network.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
obtaining, by a processor, a network map of a plurality of devices based on a scan of a network at a particular period of time;
determining, by the processor, a software being performed via type information of at least one device based on the scan of the network and data associated with the at least one device;
generating, by the processor, a type label for the at least one device based on the software being performed by:
comparing the type information of the at least one device to other type information of a plurality of other devices within the network to generate a confidence score for the at least one device indicative of a measure of similarity between the at least one device and the plurality of other devices,
wherein generating the confidence score comprises calculating a device-specific confidence score based on an output of the scan of the network, the output of the scan comprising one or more values assigned to a plurality of features associated with the type information of the at least one device,
grouping the type information of the at least one device with the other type information of the plurality of other devices based on the confidence score meeting a predetermined threshold, and
determining the type label for the at least one device based on of the grouping of the type information; and
generating, by the processor, a network security map that maps the at least one device based on the type label of the at least one device so as to facilitate causing at least one security action with respect to the at least one device within the network, wherein the at least one security action is correlated with the confidence score of the at least one device within the network security map.

2. The method of claim 1, wherein the data comprises an active internet protocol address within a range associated with the device.

3. The method of claim 1, wherein the network comprises a target network within a plurality of networks.

4. The method of claim 1, wherein the scan of the network comprises a vulnerability analysis of the device and the plurality of devices within the network.

5. The method of claim 1, wherein the scan of the network comprises an availability analysis of the device and the plurality of devices within the network.

6. The method of claim 1, wherein the type information of the device comprises metadata related to each device and software being performed by the device.

7. The method of claim 1, further comprising predicting type information for the device by utilizing a trained machine learning module to analyze historical data within the network and the data associated with the device.

8. The method of claim 7, wherein the trained machine learning module comprises a trained encoder capable of dynamically tracking modifications to the data associated with the device.

9. The method of claim 1, further comprising calculating a criticality score of the device based on the type information within the network.

10. The method of claim 9, wherein the criticality score of the device is representative of a degree of importance to security of the network.

11. The method of claim 1, wherein the type information comprises a device category, wherein the device category is one of workstation, router, server, printer, camera, or a combination thereof.

12. The method of claim 1, further comprising conducting the scan of the network and generating the confidence score are conducted repeatedly at a predetermined frequency.

13. The method of claim 1, further comprising calculating a device risk score for the device in the network based on a historical data associated within the network, a number of detected vulnerabilities within the network, and a criticality score of the device.

14. A computer-implemented method comprising:
obtaining, by a processor, a network map of a plurality of devices based on a scan of a network at a particular period of time;
predicting, by the processor, type information for at least one device by utilizing a trained machine learning module to analyze historical data within the network to form predicted type information;
determining, by the processor, a candidate type information of the at least one device based on the scan of the network and the predicted type information data associated with the at least one device;
comparing, by the processor, the candidate type information of the at least one device to other type information of a plurality of other devices within the network to generate a confidence score for the at least one device indicative of a measure of similarity between the at least one device and the plurality of other devices,
wherein generating the confidence score comprises calculating a device-specific confidence score for the at least one device based on an output of the scan of the network, the output of the scan comprising one or more values assigned to a plurality of features associated with the type information of the at least one device;
validating, by the processor, the candidate type information of the at least one device based on the confidence score meeting a predetermined threshold to form validated type information;
assigning, by the processor, a type label to the at least one device based on the validated type information; and
generating, by the processor, a network security map that maps the at least one device based on the type label of the at least one device so as to facilitate causing at least one security action with respect to the at least one device within the network, wherein the at least one security action is correlated with the confidence score of the at least one device within the network security map.

15. The method of claim 14, wherein the data comprises an active internet protocol address within a range associated with the device.

16. The method of claim 14, wherein the scan of the network comprises a vulnerability analysis of the device and the plurality of devices within the network.

17. The method of claim 14, wherein the scan of the network comprises an availability analysis of the device and the plurality of devices within the network.

18. The method of claim 14, wherein the type information of the device comprises metadata related to each device and software being performed by the device.

19. The method of claim 14, wherein the trained machine learning module comprises a trained encoder capable of dynamically tracking modifications to the data associated with the device.

20. The method of claim 14, further comprising a criticality score of the device based on the type information within the network.

21. The method of claim 20, wherein the criticality score of the device is representative of a degree of importance to security of the network.

22. The method of claim 14, further comprising conducting the scan of the network and generating the confidence score are conducted repeatedly at a predetermined frequency.

23. The method of claim 14, further comprising calculating a device risk score for the device in the network based on a historical data associated within the network, a number of vulnerabilities within the network, and a criticality score of the device.

24. A system comprises:
a non-transient computer memory, storing software instructions;
at least one processor of a computing device associated with a user;
wherein, when the processor executes the software instructions, the computing device is programmed to:
obtain a network map of a plurality of devices based on a scan of a network at a particular period of time;
predict type information for at least one device by utilizing a trained machine learning module to analyze historical data within the network to form predicted type information;
determine a candidate type information of the at least one device based on the scan of the network and the predicted type information data associated with the at least one device;
compare the candidate type information of the at least one device to other type information of a plurality of other devices within the network to generate a confidence score for the at least one device indicative of a measure of similarity between the at least one device and the plurality of other devices,
wherein generating the confidence score comprises calculating a device-specific confidence score based on an output of the scan of the network, the output of the scan comprising one or more values assigned to a plurality of features associated with the type information of the at least one device;

validate the candidate type information of the at least one device based on the confidence score meeting a predetermined threshold to form validated type information;

assign a type label to the at least one device based on the validated type information; and generate a network security map that maps the at least one device based on the type label of the at least one device so as to facilitate causing at least one security action with respect to the at least one device within the network, wherein the at least one security action is correlated with the confidence score of the at least one device within the network security map.

25. The system of claim 24, wherein the type information of the device comprises metadata related to each device and software being performed by the device.

26. The system of claim 24, wherein the trained machine learning module comprises a trained encoder capable of dynamically tracking modifications to the data associated with the device.

27. A system comprises:
   a non-transient computer memory, storing software instructions;
   at least one processor of a computing device associated with a user;
   wherein, when the processor executes the software instructions, the computing device is programmed to:
      obtain a network map of a plurality of devices based on a scan of a network at a particular period of time;
      determine a software being performed via type information of at least one device based on the scan of the network and data associated with the at least one device;
      generate a type label for the at least one device based on the software being performed by:
         compare the type information of the at least one device to other type information of a plurality of other devices within the network to generate a confidence score for the at least one device indicative of a measure of similarity between the at least one device and the plurality of other devices,
            wherein generating the confidence score comprises calculating a device-specific confidence score based on an output of the scan of the network, the output of the scan comprising one or more values assigned to a plurality of features associated with the type information of the at least one device;
         group the type information of the at least one device with the other type information of the plurality of other devices based on the confidence score meeting a predetermined threshold, and
         determine the type label for the at least one device based on of the grouping of the type information; and
      generate a network security map that maps the at least one device based on the type label of the at least one device so as to facilitate causing at least one security action with respect to the at least one device within the network, wherein the at least one security action is correlated with the confidence score of the at least one device within the network security map.

* * * * *